US012709829B2

(12) United States Patent
Nishihara et al.

(10) Patent No.: US 12,709,829 B2
(45) Date of Patent: Aug. 18, 2026

(54) HONEYCOMB STRUCTURE AND METHOD FOR MANUFACTURING SAME

(71) Applicant: TOHOKU UNIVERSITY, Sendai (JP)

(72) Inventors: Hirotomo Nishihara, Sendai (JP); Mao Owada, Sendai (JP); Rui Tang, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 31 days.

(21) Appl. No.: 18/700,109

(22) PCT Filed: Oct. 21, 2021

(86) PCT No.: PCT/JP2021/038889
§ 371 (c)(1),
(2) Date: Apr. 10, 2024

(87) PCT Pub. No.: WO2023/067749
PCT Pub. Date: Apr. 27, 2023

(65) Prior Publication Data
US 2025/0230590 A1 Jul. 17, 2025

(51) Int. Cl.
*D04H 1/4382* (2012.01)
*D04H 1/425* (2012.01)
(Continued)

(52) U.S. Cl.
CPC ......... *D04H 1/43838* (2020.05); *D04H 1/425* (2013.01); *D04H 1/74* (2013.01);
(Continued)

(58) Field of Classification Search
CPC ...... D04H 1/43838; D04H 1/425; D04H 1/74; B01D 39/18; B01D 2239/025;
(Continued)

(56) References Cited

U.S. PATENT DOCUMENTS

2017/0314200 A1* 11/2017 Johansson ............... C08B 15/02
2020/0370238 A1 11/2020 Tamura et al.

FOREIGN PATENT DOCUMENTS

JP 2004307294 A 11/2004
JP 2006325534 A 12/2006
(Continued)

OTHER PUBLICATIONS

Translation of Miyamoto accessed on ESpaceNet Nov. 15, 2025 (Year: 2012).*

(Continued)

*Primary Examiner* — JaMel M Nelson
*Assistant Examiner* — Erica Hartsell Funk
(74) *Attorney, Agent, or Firm* — Dority & Manning, P.A.

(57) ABSTRACT

A honeycomb structure which is an aggregate of a plurality of microtubes comprising a cellulose nanofiber, wherein the microtubes have an opening shape which is polygonal, wherein the ratio of an average long diameter μ2 (μm) to an average short diameter μ1 (μm) (μ2/μ1) is 2.0 or less, when the average long diameter μ2 (μm) is an average of longest diameters of the opening diameters of the individual microtubes, and the average short diameter μ1 (μm) is an average of shortest diameters of the opening diameters of the individual microtubes, and wherein both standard deviations σ1, σ2 for the respective frequency distributions of the short diameter and long diameter in the opening shape of the microtubes are 20.0 μm or less.

6 Claims, 3 Drawing Sheets

(51) Int. Cl.
*D04H 1/74* (2006.01)
*B01D 39/18* (2006.01)

(52) U.S. Cl.
CPC ........ *B01D 39/18* (2013.01); *B01D 2239/025* (2013.01); *B01D 2239/1233* (2013.01); *B01D 2239/1291* (2013.01); *D10B 2401/063* (2013.01); *D10B 2505/04* (2013.01)

(58) Field of Classification Search
CPC .... B01D 2239/1233; B01D 2239/1291; D10B 2401/063; D10B 2505/04
See application file for complete search history.

(56) References Cited

FOREIGN PATENT DOCUMENTS

| | | | | | |
|---|---|---|---|---|---|
| JP | 2009046341 A | | 3/2009 | | |
| JP | 2012167152 A | * | 9/2012 | | |
| JP | 2012167218 A | | 9/2012 | | |
| JP | 2017506678 A | | 3/2017 | | |
| WO | WO 2015/114630 A1 | | 8/2015 | | |
| WO | WO-2019151040 A1 | * | 8/2019 | ............ | D06M 13/35 |

OTHER PUBLICATIONS

Besbes, Carbohydrate Polymers, vol. 84, Issue 3, Mar. 17, 2011, pp. 975-983 (Year: 2011).*

International Search Report (with English translation) for corresponding Application No. PCT/JP2021/038889, dated Dec. 21, 2021, 4 pages.

* cited by examiner

[FIG. 1]
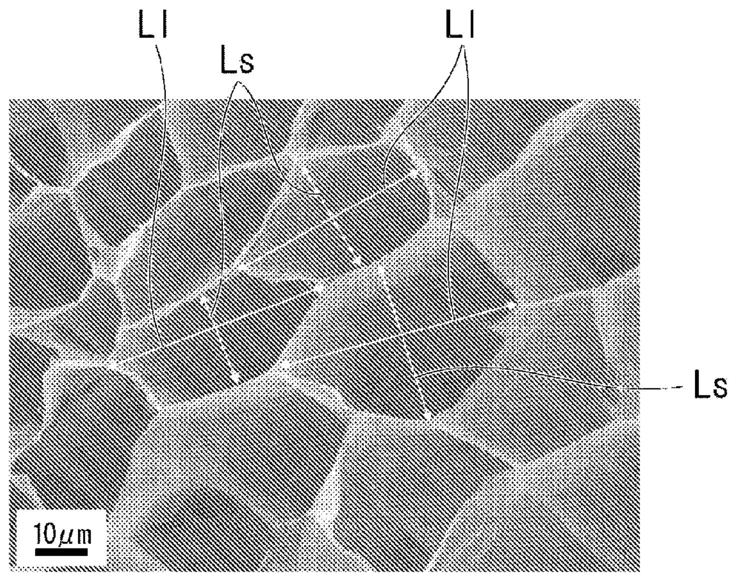
[FIG. 2]
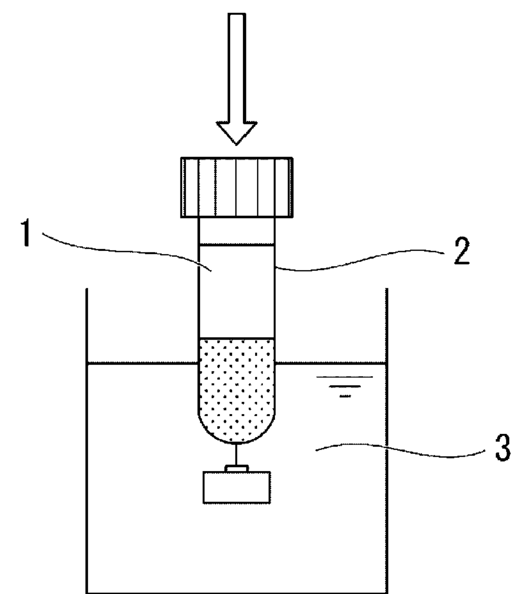

[FIG. 3]
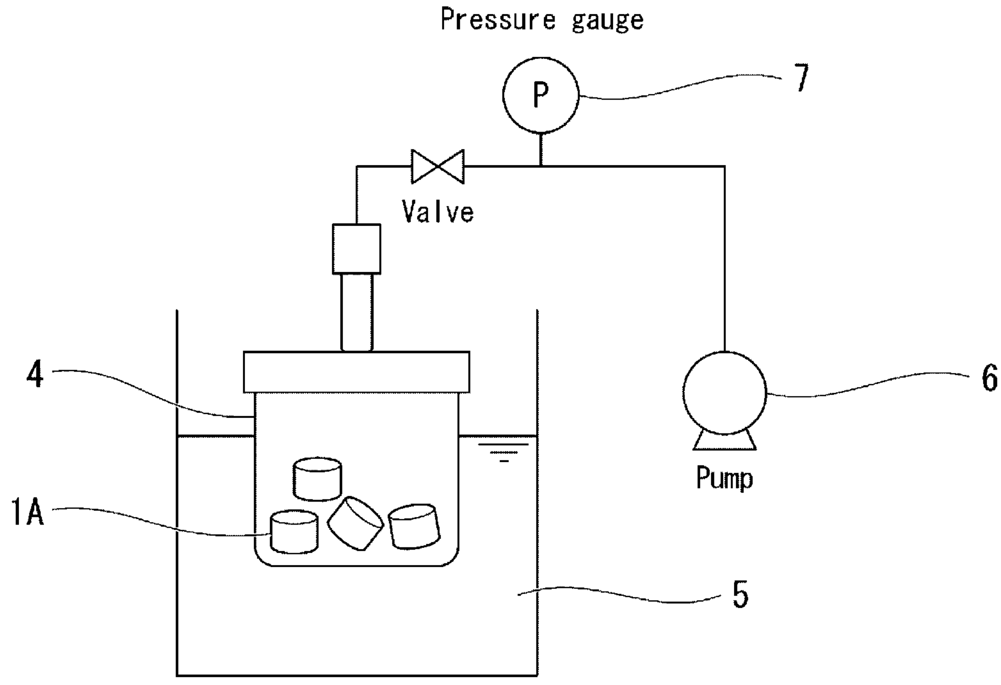

[FIG. 4]
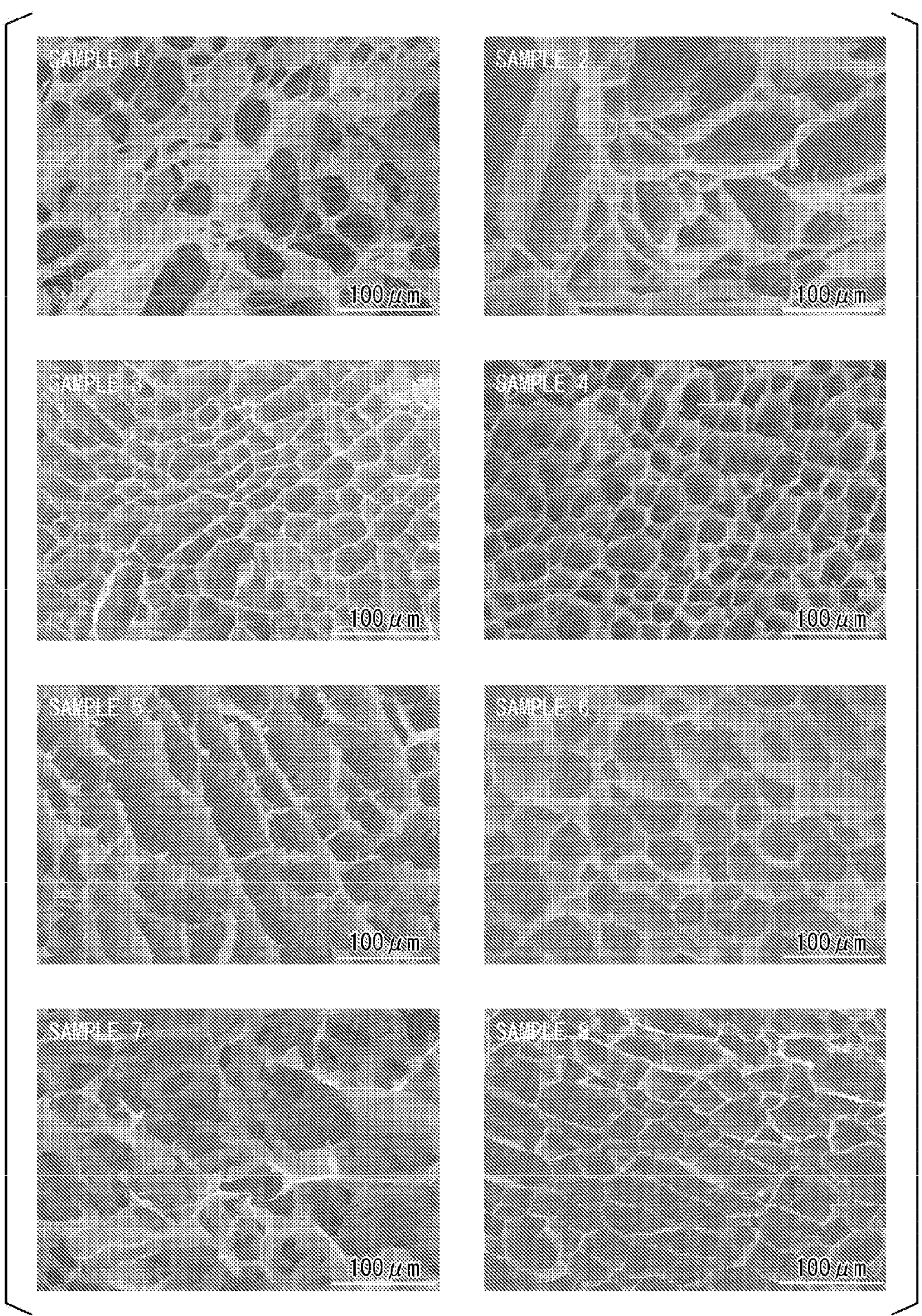

HONEYCOMB STRUCTURE AND METHOD FOR MANUFACTURING SAME

CROSS-REFERENCE OF RELATED APPLICATIONS

This application is the U.S. National Stage entry of International Application No. PCT/JP2021/038889, filed on Oct. 21, 2021, which is hereby incorporated herein by reference in its entirety for all purposes.

TECHNICAL FIELD

The present invention relates to a honeycomb structure and a method for producing the same.

BACKGROUND ART

In recent years, studies are being made on porous materials and structures of a honeycomb form using various types of materials.

PTL 1 has a description of a honeycomb porous material which is formed from bacterial cellulose, and which has a pore diameter of 10 nm to 1,000 μm and a thickness of 0.1 to 10 μm.

PTL 2 is directed to a method for producing a silica gel of a honeycomb form, and has a description of the method having the unidirectional freezing step in which a sample is inserted in the constant direction into a coolant to cause the sample to freeze, forming a honeycomb form. Particularly, a characteristic feature of the method resides in that, by controlling the rate of inserting the sample into the coolant in the unidirectional freezing step, the honeycomb pore opening diameter obtained after freezing is controlled.

PTL 3 is directed to a method for producing a nanoporous silica of a substantially honeycomb structure, and has a description about the method in which a vessel filled with an aqueous colloidal silica solution containing silica particles is inserted into a coolant and rapidly cooled to cause water in the aqueous colloidal silica solution to freeze and grow unidirectionally into a thin columnar shape, and then the water is dried and removed, producing a nanoporous silica of a substantially honeycomb structure which comprises a silica component and has pores that are substantially through-holes and substantially parallel to each other.

In addition, PTLs 4 and 5 are directed to a microtube aggregate structure which is an aggregate of microtubes formed from a specific polysaccharide, and disclose a method for producing the structure, in which a vessel containing therein a polysaccharide-containing liquid containing a polysaccharide is inserted into a coolant to cause the solvent in the polysaccharide-containing liquid to freeze and grow vertically and upward with respect to the surface of the coolant, and then the frozen solvent is removed.

CITATION LIST

Patent Literature

PTL 1: JP2006-325534A

PTL 2: JP2004-307294A

PTL 3: JP2009-46341A

PTL 4: JP2012-167218A

PTL 5: JP2012-167152A

SUMMARY OF INVENTION

Technical Problem

In the prior art techniques including PTLs 1 to 5, studies have been made on a structure of a honeycomb form (hereinafter, frequently referred to as a "honeycomb structure") comprising a porous material or an aggregate of long tubular structures (microtubes) and using various materials, but it is likely that a problem occurs in that the opening shape of the microtubes is not uniform. Further, recently, from the viewpoint of surely achieving the strength of the honeycomb structure, a further improvement of the uniformity of the cross-sectional shape of the microtubes is desired.

In view of the above, an object of the present invention is to provide a method for producing a honeycomb structure having excellent uniformity of the opening shape of the microtubes.

Solution to Problem

The present inventors first have focused attention on the method for producing a honeycomb structure comprising a cellulose nanofiber, and have conducted studies on the conditions for the method and dispersion from the viewpoint of the uniformity of the opening shape of tubular materials. As a result, it has been found that, by employing a so-called "unidirectional freezing method" in which a water dispersion of a cellulose nanofiber is permitted to unidirectionally freeze at a constant rate, and controlling the light transmittance of the water dispersion to be in the appropriate range, a honeycomb structure having excellent shape uniformity can be produced, and the present invention has been completed.

The present invention has been made based on the above findings, and the gist of the invention is as follows.

(1) A honeycomb structure according to an embodiment of the present invention is a honeycomb structure which is an aggregate of a plurality of microtubes comprising a cellulose nanofiber, the microtubes having an opening shape which is polygonal, wherein the ratio of an average long diameter $\mu 2$ (μm) to an average short diameter $\mu 1$ (μm) ($\mu 2/\mu 1$) is 2.0 or less, when the average long diameter $\mu 2$ (μm) is an average of longest diameters of the opening diameters of the individual microtubes, and the average short diameter $\mu 1$ (μm) is an average of shortest diameters of the opening diameters of the individual microtubes, and wherein both standard deviations $\sigma 1$, $\sigma 2$ for the respective frequency distributions of the short diameter and long diameter in the opening shape of the microtubes are 20.0 μm or less.

(2) In the honeycomb structure according to item (1) above, the microtubes may have an average opening diameter of 0.1 to 200 μm.

(3) The honeycomb structure according to item (1) or (2) above may have a Young's modulus of 0.1 to 10,000 kPa.

(4) The honeycomb structure according to any one of items (1) to (3) above may be obtained by subjecting a dispersion of the cellulose nanofiber to freeze-drying.

(5) A method for producing a honeycomb structure according to an embodiment of the present invention is a method for producing a honeycomb structure of a cellulose nanofiber, the method comprising the steps of: slowly inserting a vessel, which contains therein a dispersion having the cellulose nanofiber dispersed in a solvent, into a coolant to cause the solvent to freeze and grow vertically and upward with respect to the surface of the coolant (freezing step); and removing the solvent from the frozen dispersion (drying step), wherein the dispersion has a cellulose nanofiber concentration of 1.0 wt % or more, and wherein the dispersion having a cellulose nanofiber concentration of 1.0 wt % has a light transmittance of 20 to 80% at a wavelength of 550 nm.

(6) In the method for producing a honeycomb structure according to item (5) above, the dispersion may have a pH of 4.0 to 13.9.

(7) In the method for producing a honeycomb structure according to item (5) or (6) above, the cellulose nanofiber may have an average fiber length of 0.15 μm or more.

(8) In the method for producing a honeycomb structure according to any one of items (5) to (7) above, the drying step may have the steps of: allowing the dispersion obtained after the freezing step to stand in an environment at 0° C. or lower under a reduced pressure for a predetermined time (first drying step); and allowing the frozen dispersion to stand in an environment at room temperature under a reduced pressure, removing the solvent (second drying step).

Advantageous Effects of Invention

In the present invention, there can be provided a honeycomb structure having excellent uniformity of the opening shape of the microtubes (hereinafter, frequently referred to as "shape uniformity") and a method for producing the same. Further, the honeycomb structure produced by the method of the present invention can be advantageously used in, for example, a face mask and a filter for air cleaner and the like.

BRIEF DESCRIPTION OF DRAWINGS

FIG. 1 is a SEM photomicrograph for explaining the method for measuring a long diameter and a short diameter of the opening diameter of microtubes.

FIG. 2 is a diagrammatic view for explaining the principle of the unidirectional freezing method in the method for producing a honeycomb structure of the present embodiment.

FIG. 3 is a diagrammatic view for explaining a preferred mode of the method for producing a honeycomb structure of the present embodiment.

FIG. 4 shows SEM images of the honeycomb structures of sample Nos. 1 to 8 in the Examples of the present invention.

DESCRIPTION OF EMBODIMENTS

Hereinbelow, a honeycomb structure according to the present embodiment and a method for producing the same will be described appropriately with reference to the drawings.

Honeycomb Structure

The honeycomb structure of the present embodiment is an aggregate of a plurality of microtubes comprising a cellulose nanofiber. The microtubes have an opening shape which is polygonal, and the ratio of an average long diameter μ2 (μm) to an average short diameter μ1 (μm) (μ2/μ1) is 2.0 or less, when the average long diameter μ2 (μm) is an average of longest diameters of the opening diameters of the individual microtubes, and the average short diameter μ1 (μm) is an average of shortest diameters of the opening diameters of the individual microtubes. Further, both standard deviations σ1, σ2 for the respective frequency distributions of the short diameter Ls and long diameter L1 in the opening shape of the microtubes are 20.0 μm or less.

The requirements for the honeycomb structure of the present embodiment are individually described below.

<Material>

The honeycomb structure of the present embodiment comprises a cellulose nanofiber. The term "cellulose" in the present embodiment means a polysaccharide of a structure in which D-glucopyranose is linked through a β-1,4 bond. Generally, cellulose is classified into natural cellulose, regenerated cellulose, fine cellulose, microcrystalline cellulose from which a non-crystalline region has been removed, and the like, according to the production method, the origin, or the like. Any of the above-mentioned cellulose can be used as a raw material for the cellulose nanofiber in the present t embodiment, and a cellulose nanofiber obtained by disintegrating the above cellulose can be employed.

The honeycomb structure of the present embodiment is a structure having an aggregate form of a plurality of microtubes, and the microtubes comprise the above-mentioned cellulose nanofiber. The opening shape of the microtubes is a polygonal shape, such as a rectangle, a pentagon, or a hexagon.

<μ2/μ1: 2.0 or Less>

In the present embodiment, with respect to the microtubes, the ratio of the average long diameter μ2 (μm) of the opening diameter to the average short diameter μ1 (μm) of the opening diameter (μ2/μ1) is 2.0 or less. With respect to the opening shape of the microtubes, when the ratio of the long diameter to the short diameter is smaller, the opening shape is more likely to be a polygonal shape free of a strain. That is, when the average long diameter μ2 of the opening diameter of the microtubes constituting the honeycomb structure of the present embodiment is 2.0 times or less the average short diameter μ1, the opening shape of the microtubes can be a uniform polygonal shape free of a strain. From such a point of view, the μ2/μ1 is preferably 1.8 or less, more preferably 1.6 or less.

In the present invention, the "average long diameter μ2" and "average short diameter μ1" in the opening shape of the microtubes mean, respectively, an average of long diameters L1 and an average of short diameters Ls of the opening diameters of the individual microtubes. The long diameter L1 and short diameter Ls of the opening diameters mean, among the opening diameters of the opening shape of the microtubes, as viewed as the plane, a diameter having the longest distance between arbitrary two points and a diameter having the shortest distance, respectively. A specific method for measuring a long diameter L1 and a short diameter Ls of the opening diameters is described later.

<Standard Deviations σ1, σ2: 20.0 μm or Less>

In the present embodiment, both standard deviations σ1, σ2 for the respective frequency distributions of the short diameter Ls and long diameter L1 in the opening shape (opening diameter) of the microtubes are 20.0 μm or less. With respect to the opening shape of the microtubes, when the standard deviations σ1, σ2 for the respective short diameter Ls and long diameter L1 are reduced, the shape and dimension of the microtubes can be prevented from being uneven, so that a honeycomb structure having excellent shape uniformity can be obtained. From such a point of view, both the standard deviations σ1 and σ2 are preferably 18.0 μm or less, more preferably 16.0 μm or less.

The average short diameter μ1 and average long diameter μ2 of the opening diameters of the microtubes and standard deviations σ1, σ2 can be determined as follows.

FIG. 1 is a SEM photomicrograph for explaining the method for measuring a long diameter L1 and a short diameter Ls of the opening diameters of the microtubes. The opening shape (cross-sectional shape) of a plurality of microtubes constituting the honeycomb structure is first observed by a scanning electron microscope (SEM), obtaining a SEM photomicrograph shown in FIG. 1. Then, using the obtained SEM photomicrograph, with respect to 50 microtubes, among the opening diameters of the individual microtubes, a diameter having the longest distance between arbitrary two points, which is a long diameter L1 (μm), and a diameter having the shortest distance, which is a short diameter Ls (μm), are measured. An "average long diameter μ2" is obtained by determining an average of the obtained long diameters L1 of the 50 microtubes. Similarly, an "average short diameter μ1" is obtained by determining an average of the obtained short diameters Ls of the 50 microtubes.

Further, a standard deviation σ2 of the long diameters L1 of the microtubes is obtained by making a calculation of a standard deviation from data (frequency distribution) for the obtained long diameters L1 of the 50 microtubes. Similarly, a standard deviation σ1 of the short diameters Ls of the microtubes is obtained by making a calculation of a standard deviation from data (frequency distribution) for the obtained short diameters Ls of the 50 microtubes.

In the honeycomb structure of the present embodiment, with respect to the average opening diameter of the microtubes, there is no particular limitation, and the average opening diameter may be appropriately determined depending on the use of the honeycomb structure, but can be, for example, in the range of from 0.1 to 200 μm. The measurement of the average opening diameter can be made by means of a SEM in the same manner as in the above-mentioned method for measuring the long diameter L1 and short diameter Ls of the opening diameters. Specifically, with respect to 50 microtubes, long diameters L1 and short diameters Ls are measured, and an average diameter of the opening diameters of the individual microtubes is determined, and an average of the obtained average diameters of the opening diameters of the 50 microtubes is calculated, obtaining an average opening diameter of a plurality of microtubes.

Further, the axial length of the microtubes in the present embodiment is theoretically unrestricted according to the below-described method for producing the honeycomb structure of the present embodiment. The fact that the axial length of the microtubes is unrestricted means that when the microtubes are observed along the axial direction from the end of the microtubes, ideally, the opening is not divided into a plurality of openings but penetrates from an opening at one end of the microtube to an opening at another end. Accordingly, the honeycomb structure of the present embodiment is preferably in the form of a bundle of so-called straws. A structure commonly referred to as a porous material lacks a direct axis line connecting an opening of a through-hole on one surface to an opening on another surface of the porous material. In this point, the honeycomb structure of the present embodiment is distinguished from a structure which is generally called a porous material.

Further, with respect to the mechanical properties of the honeycomb structure of the present embodiment, there is no particular limitation, but, for example, the honeycomb structure may have a Young's modulus of 0.1 to 10,000 kPa. When the honeycomb structure has a Young's modulus in the above-mentioned range, the honeycomb structure of the present embodiment can be advantageously used in applications, such as an adsorbent and a carrier for catalyst. The Young's modulus of the honeycomb structure can be obtained by measuring a stress-strain curve using a strength tester ("AG-50kNXplus", manufactured by Shimadzu Corporation) and determining a Young's modulus from the obtained stress-strain curve.

The honeycomb structure of the present embodiment has been described above, and the honeycomb structure of the present embodiment can provide a honeycomb structure having excellent shape uniformity of the microtubes. Further, the honeycomb structure of the present embodiment can be advantageously used in, for example, a face mask and a filter for air cleaner and the like. The above-mentioned μ2/μ1 and standard deviations can be achieved by controlling the conditions for preparing a dispersion of a cellulose nanofiber in the below-described method for producing the honeycomb structure.

Method for Producing a Honeycomb Structure

A method for producing the above-described honeycomb structure of the present embodiment is described below with reference to the drawings.

The method for producing the honeycomb structure according to an embodiment of the present invention is a method for producing a honeycomb structure of a cellulose nanofiber using aqueous solvent, the method comprising the steps of: slowly inserting a vessel, which contains therein a dispersion having the cellulose nanofiber dispersed in aqueous solvent, into a coolant to cause the solvent to freeze and grow vertically and upward with respect to the surface of the coolant (freezing step); and removing the frozen solvent (drying step), wherein the dispersion has a cellulose nanofiber concentration of 1.0 wt % or more, and wherein the dispersion having a cellulose nanofiber concentration of 1.0 wt % has a light transmittance in the range of from 20 to 80% at a wavelength of 550 nm.

<Freezing Step>

In the freezing step in the present embodiment, a honeycomb structure comprising a cellulose nanofiber (CNF) is produced employing a so-called "unidirectional freezing method" in which a dispersion of the cellulose nanofiber is permitted to unidirectionally freeze at a constant rate.

The "unidirectional freezing method" is a method in which a dispersion of a cellulose nanofiber using water or the like as a solvent (cellulose nanofiber dispersion) is directionally frozen to cause the solvent to unidirectionally grow into a columnar shape to form a plurality of ice columns, causing aggregation of the cellulose nanofiber in voids between the ice columns. FIG. 2 is a diagrammatic view for explaining the principle of the unidirectional freezing method in the present embodiment. In the "unidirectional freezing method" in the present embodiment, specifically, as shown in FIG. 2, a cellulose nanofiber dispersion 1 is placed in a vessel 2, and the vessel 2 is inserted into a coolant 3 at a constant rate in the direction indicated by an arrow. The portion of the frozen solvent inserted into the coolant 3 grows into a columnar shape in the direction of inserting the vessel. Then, freeze-drying is conducted by allowing the frozen columnar crystals to stand in a reduced pressure environment to cause sublimation of the frozen solvent portion, removing the solvent. A honeycomb structure composed of an aggregate of long and narrow pores (microtubes) comprising a cellulose nanofiber is produced through the above-mentioned steps. The term “aggregate of long and narrow pores (microtubes)” means an aggregate composed of a plurality of microtubes which are linear through-holes, wherein the microtubes are individually oriented substantially unidirectionally.

The vessel 2 containing therein the cellulose nanofiber dispersion 1 is slowly inserted into the coolant 3. Therefore, the vessel 2 desirably has such physical properties (for example, coefficient of expansion) that the vessel does not suffer a damage due to a temperature difference caused between the portion of the vessel 2 immersed in the coolant 3 and the portion of the vessel just above the coolant 3. Examples of materials for the vessel 2 include polypropylene, polyethylene, and polyvinyl chloride. Of these, polypropylene is more desirable. Polypropylene has a thermal conductivity of about 0.11 (W/m·K), which is smaller than the thermal conductivity of water (0.6 W/m·K) or ice (1.6 W/m·K)). For this reason, by using a vessel made of polypropylene, it is more likely that the frozen surface of the dispersion can be kept parallel to the surface of a coolant (such as liquid nitrogen).

Further, the vessel 2 may have any form as long as the form of the vessel has a predetermined height such that microtubes constituting the honeycomb structure and having an axial length can be formed. The form and size of the vessel 2 can be determined according to the use of the honeycomb structure.

The cellulose nanofiber dispersion 1 has a cellulose nanofiber concentration of 1.0 wt % or more. When the cellulose nanofiber concentration of the dispersion is less than 1.0 wt %, there is a danger that deterioration of the shape of the microtubes (malformation) is caused. Further, such malformation may reduce the strength of the structure. For this reason, the cellulose nanofiber concentration of the cellulose nanofiber dispersion 1 is 1.0 wt % or more. From the viewpoint of improvement of the strength of the structure, the cellulose nanofiber concentration of the dispersion is preferably 2.0 wt % or more. With respect to the upper limit of the cellulose nanofiber concentration of the dispersion, there is no particular limitation, but, when the cellulose nanofiber concentration is more than 5.5 wt %, there is a danger that bubbles remain in the honeycomb structure. Therefore, the cellulose nanofiber concentration of the dispersion can be 5.5 wt % or less. When the cellulose nanofiber concentration of the dispersion is too high, the dispersion is increased in viscosity to be in a gel state, making it difficult to remove bubbles. When bubbles cannot be removed before freeze-drying and are present in the dispersion, the bubbles may remain as such after freeze-drying.

From the viewpoint of the shape uniformity of the honeycomb structure, it is necessary that the cellulose nanofiber dispersion 1 have a light transmittance in the predetermined range. Specifically, with respect to the dispersion used in the freezing step, the dispersion having a cellulose nanofiber concentration of 1.0 wt % has a light transmittance in the range of from 20 to 80% at a wavelength of 550 nm. The present inventors have obtained novel findings that there is a constant correlation between the transparency of the cellulose nanofiber dispersion, i.e., light transmittance, and the shape uniformity of the honeycomb structure. Specifically, by using the dispersion having a light transmittance in the above-mentioned range, a honeycomb structure having excellent shape uniformity of the microtubes can be produced. When the dispersion having a cellulose nanofiber concentration of 1.0 wt % has a light transmittance of more than 80%, it is likely that the degree of dispersion of the cellulose nanofiber in the nanofiber dispersion is excessively increased, so that a honeycomb structure cannot be obtained. On the other hand, when the dispersion having a cellulose nanofiber concentration of 1.0 wt % has a light transmittance of less than 20%, it is likely that remarkable coagulation of the cellulose nanofiber is caused, so that the resultant coagulation product inhibits formation of a honeycomb structure. Therefore, the cellulose nanofiber dispersion having a cellulose nanofiber concentration of 1.0 wt % has a light transmittance in the range of from 20 to 80%, preferably a light transmittance of 35% or more and 60% or less at a wavelength of 550 nm.

As mentioned above, with respect to the dispersion used in the freezing step in the present embodiment, the dispersion having a cellulose nanofiber concentration of 1.0 wt % has a light transmittance in the range of from 20 to 80% at a wavelength of 550 nm, and has a cellulose nanofiber concentration of 1.0 wt % or more, and it is important that such a dispersion is used in the freezing step, and, by virtue of this, a honeycomb structure having excellent shape uniformity can be produced.

A method for measuring a light transmittance of the cellulose nanofiber dispersion at a wavelength of 550 nm is as follows. A cellulose nanofiber dispersion (dispersing medium: water) is first prepared so as to have a cellulose nanofiber concentration of 1.0 wt %, and, using an ultraviolet-visible spectrophotometer “V670” (manufactured by JASCO Corporation), and using a cell having an optical path length of 10 mm, a light transmittance at a wavelength of 550 nm is measured.

From the viewpoint of surely obtaining the Young's modulus of the honeycomb structure and controlling the light transmittance, the cellulose nanofiber dispersion preferably has a pH in the range of from 4.5 to 13.9. When the pH of the cellulose nanofiber dispersion is too low, it is likely that electrostatic repulsion of the cellulose nanofiber is reduced, so that remarkable coagulation of the cellulose nanofiber is caused. When coagulation of the cellulose nanofiber is marked, there is a danger that such coagulation inhibits growth of ice crystals, leading to malformation of the honeycomb structure. Therefore, the pH of the cellulose nanofiber dispersion is more preferably in the range of from 5.0 to 13.0. When severe coagulation of the cellulose nanofiber is caused, light scattering is increased, and therefore the light transmittance of the dispersion is reduced.

The term “cellulose” in the present embodiment means a polysaccharide of a structure in which D-glucopyranose is linked through a β-1,4 bond. Generally, cellulose is classified into natural cellulose, regenerated cellulose, fine cellulose, microcrystalline cellulose, the non-crystalline region of which has been removed, and the like, according to the production method, the origin, or the like, and any of the above-mentioned cellulose can be used as a raw material for the cellulose nanofiber in the present embodiment, and the cellulose nanofiber is produced by disintegrating the above cellulose.

As a material for the honeycomb structure, the use of a polysaccharide other than cellulose is considered, but the studies made by the present inventors have found that cellulose is most preferred from the viewpoint of stabilizing the honeycomb form and reducing a pressure loss. For example, the use of dextrin causes a disadvantage in that a honeycomb structure cannot be formed.

From the viewpoint of stably producing a honeycomb structure having excellent shape uniformity, the cellulose nanofiber preferably has an average fiber length of 0.15 μm or more. When the average fiber length of the cellulose nanofiber is too small, it is likely that the degree of dispersion of the cellulose nanofiber in the nanofiber dispersion is excessively increased, leading to malformation of the honeycomb structure. In view of this, the average fiber length of the cellulose nanofiber is more preferably 0.3 μm or more. When the degree of dispersion of the cellulose nanofiber is excessively increased, the light transmittance of the nanofiber dispersion is increased. Further, with respect to the upper limit of the average fiber length of the cellulose nanofiber, there is no particular limitation, but the upper limit may be 100 μm or less, and may be 10 μm or less.

With respect to the solvent for the cellulose nanofiber dispersion, there is no particular limitation as long as the solvent is capable of homogeneously dispersing or dissolving therein the cellulose nanofiber and has a freezing point, and generally, examples of the solvents include polar solvents, such as water, methanol, ethanol, 1-propanol, 2-propanol, 1-butanol, t-butanol, acetic acid, dimethyl sulfoxide, dimethylformamide, dimethylacetamide, acetonitrile, and dioxane. Of these, in view of easy availability and reduced cost, water is preferred. These solvents may be used individually or in combination.

With respect to the coolant, there is no particular limitation as long as the coolant is a liquid (anti-freeze) which is not frozen even at a temperature at which the solvent in the cellulose nanofiber dispersion can be frozen, and generally, examples of the coolants include water, an aqueous sodium chloride solution, ethylene glycol, carbon tetrachloride, acetonitrile, methanol, ethanol, acetone, diethyl ether, liquid nitrogen, liquid hydrogen, liquid argon, and liquid helium. Of these, liquid nitrogen is preferred because it is easily available and inexpensive and is not frozen at relatively low temperatures. As the coolant, not only a liquid but also a space cooled by a cooling apparatus or the like (for example, air cooled to a temperature at which the cellulose nanofiber dispersion can be frozen) can be used.

As means for cooling the coolant, a freezing medium and/or a cooling apparatus may be used. Examples of freezing media include ice, a mixture of sodium chloride and ice, a mixture of sodium acetate and ice, a mixture of calcium chloride and ice, a mixture of ammonium chloride and ice, a mixture of ammonium nitrate and ice, a mixture of ammonium chloride, potassium nitrate, and ice, a mixture of sodium bromide and ice, a mixture of sodium chloride and ice, a mixture of potassium chloride and ice, a mixture of magnesium chloride and ice, a mixture of zinc chloride and ice, and dry ice. With respect to the method of using the freezing medium, it is necessary to appropriately select a method in which the freezing medium indirectly cools the coolant through a coolant vessel or the like without being in contact with the coolant, or a method in which the freezing medium is directly mixed into the coolant. Examples of cooling apparatuses include an immersion condenser. The cooling apparatus may be directly in contact with the coolant.

With respect to the temperature of the cellulose nanofiber dispersion and the temperature of the coolant, there is no particular limitation, and the temperature of the cellulose nanofiber dispersion is not particularly limited as long as the temperature is higher than the freezing point of the solvent for the cellulose nanofiber dispersion and lower than the boiling point of the solvent. Further, the temperature of the coolant is not particularly limited as long as it is a temperature at which the solvent in the cellulose nanofiber dispersion can be frozen. For example, when water is used as a solvent, the temperature of the cellulose nanofiber dispersion can be higher than 0° C. which is the freezing point of water and lower than 100° C. which is the boiling point of water, and the temperature of the coolant can be lower than 0° C. which is the freezing point of water.

In the unidirectional freezing method in the present embodiment, the vessel containing therein the cellulose nanofiber dispersion is slowly immersed in the coolant, and, with respect to the rate of immersing the vessel in the coolant (immersion rate), there is no particular limitation, and, for example, the immersion rate can be 3 to 300 μm/second, preferably 10 to 100 μm/second. When the immersion rate is too low, a disadvantage is caused in view of the productivity. On the other hand, when the immersion rate is too high, it is likely that a problem arises in that the pores (microtubes) constituting the honeycomb structure have poor linearity. The immersion rate is desirably a constant rate, and the immersion rate can be controlled to be constant by using a constant speed motor (not shown) which is connected to the vessel.

In the present embodiment, for adjusting the average opening diameter of the microtubes of the honeycomb structure so as to be in the above-mentioned preferred range, control of the immersion rate is effective. The honeycomb structure obtained after freeze-drying has pores in the portion corresponding to the columnar ice crystals, which was present before drying. In other words, the diameter of the columnar ice crystals is consistent with the opening diameter of the finally obtained honeycomb structure. Accordingly, the diameter of the columnar ice crystals, i.e., the opening diameter of the finally obtained honeycomb structure can be adjusted by controlling the immersion rate (freezing rate) and freezing temperature in unidirectional freezing. As the immersion rate is increased, the diameter of the columnar ice crystals is reduced. Further, as the freezing temperature is reduced, the diameter of the columnar ice crystals is reduced.

When the vessel containing therein the cellulose nanofiber dispersion is slowly immersed in the coolant, the solvent in the dispersion freezes while growing vertically and upward with respect to the surface of the coolant into a columnar shape. In this instance, as the frozen vertically elongated columnar crystals grow, the cellulose nanofiber which is a solute is collected around the crystals to be in a state like a wall. For example, when the solvent is water, this is a state such that a wall composed of the cellulose nanofiber molecules is formed around each of ice columns like frost columns. In other words, the state is such that aggregation of the cellulose nanofiber molecules forms a plurality of microtubes (pores) and pores of the microtubes are filled with ice. Hereinafter, a material in such a state that the pores of the microtubes are filled with ice is referred to as frozen cellulose nanofiber dispersion.

<Drying Step>

After the freezing step, the obtained frozen cellulose nanofiber dispersion and the vessel are together removed from the coolant, and a drying step for removing the frozen solvent is conducted. Thus, a honeycomb structure comprising a cellulose nanofiber is obtained.

With respect to the method for removing the frozen solvent, any solvent removal method can be employed as long as the structure of the frozen cellulose nanofiber dispersion suffers no damage, but especially, freeze-drying is desirably used. Freeze-drying has an advantage in that the solvent undergoes sublimation and therefore melting of the solvent and redispersion of the cellulose nanofiber can be suppressed. Further, when freeze-substitution is once performed to replace the frozen solvent with such an immiscible solvent that the cellulose nanofiber is not dispersed, the resultant cellulose nanofiber may be subjected to air-drying or thermal drying.

When employing freeze-drying as a solvent removal method, the freeze-drying is preferably conducted under the conditions described below.

The frozen cellulose nanofiber dispersion formed in the vessel is first cut, while maintaining the frozen state, together with the vessel, into cylinder pieces each having a predetermined length. Then, the cut cylinder pieces are allowed to stand in a reduced pressure environment for a predetermined time, so that, while maintaining the frozen state, the solvent (for example, water) is subjected to sublimation and drying. Thus, the solvent in the frozen cellulose nanofiber dispersion is removed, so that only a structure of a honeycomb form composed of an aggregate of the microtubes (pores) remains.

Preferred conditions for the reduced pressure environment in the freeze-drying may be appropriately selected depending on the solvent used, but, for example, when water is used as a solvent, an atmosphere at −30 to 50° C. under a reduced pressure of 1 to 1,000 Pa can be employed. Further, the retention time for allowing the cylinder pieces in a reduced pressure environment may be appropriately determined depending on the solvent used or the reduced pressure atmosphere, but, for example, can be 20 to 100 hours.

In the above-described method for producing a honeycomb structure of the present embodiment, the drying step in the present embodiment may have the steps of: allowing the dispersion obtained after the freezing step to stand in an environment at −5° C. under a reduced pressure for a predetermined time (first drying step); and allowing the frozen solvent to stand in an environment at room temperature under a reduced pressure, removing the solvent (second drying step). With respect to the drying step, by conducting two stages having different conditions for the drying step as mentioned above, the time required for drying can be remarkably reduced, as compared to the drying time required in a conventional method. The first drying step and second drying step are described below in detail.

First Drying Step

FIG. 3 is a diagrammatic view for explaining a preferred mode of the drying step in the method for producing a honeycomb structure of the present embodiment. In the first drying step, the frozen cellulose nanofiber dispersion obtained in the freezing step is allowed to stand in an environment at 0° C. or lower under a reduced pressure for a predetermined time and dried.

Specifically, the frozen cellulose nanofiber dispersion formed in the vessel 2 shown in FIG. 2 is first cut into cylinder pieces each having a predetermined length while maintaining the frozen state. Then, as shown in FIG. 3, the cut cylinder pieces 1A are placed in a closed vessel 4, and then the closed vessel is immersed in a coolant bath 5 containing therein a coolant (−80 to 0° C.) so that an atmosphere at −80 to 0° C. under a reduced pressure is created in the closed vessel 4. Further, the cylinder pieces 1A in the closed vessel 4 are allowed to stand in a reduced pressure environment for a predetermined time, so that the cylinder pieces 1A are dried. Prior to the second drying step, by preliminarily drying the cylinder pieces 1A in a low-temperature reduced-pressure environment (first drying) as mentioned above, the frozen solvent (for example, ice) in the cylinder pieces 1A can be prevented from melting in the second drying step.

From the viewpoint of facilitating sublimation of the frozen solvent in the frozen cellulose nanofiber dispersion, the temperature of the coolant in the coolant bath 5 is −80 to 0° C. When the temperature of the coolant is too low, it is difficult to cause sublimation of the solvent, and therefore the temperature of the coolant is −80° C. or higher. On the other hand, when the temperature of the coolant is too high, it is likely that the solvent in the frozen state melts, and therefore the temperature of the coolant is 0° C. or lower.

With respect to the means for drying the cylinder pieces 1A in the closed vessel 4 in a reduced pressure environment, there is no particular limitation, but an oil rotary vacuum pump may be used.

In the first drying step, the proceeding of sublimation and drying of the frozen solvent can be checked by observing the pressure in the closed vessel 4. For example, the pressure in the closed vessel 4 can be measured by a pressure gauge 7 (for example, a Pirani vacuum gauge) which is connected between the closed vessel 4 and a pressure reducing means 6 (for example, a vacuum pump).

In the present embodiment, the pressure in the closed vessel 4 is increased soon after reduction of the pressure in the closed vessel 4 is started. The reason for this is that the frozen solvent (for example, ice) in the frozen dispersion undergoes sublimation to generate water vapor.

With respect to the retention time in the first drying step, there is no particular limitation, and the retention time can be 5 minutes to 48 hours.

Second Drying Step

After the first drying step, while maintaining the reduced pressure in the closed vessel 4, the closed vessel 4 containing therein the cylinder pieces 1A is removed from the coolant bath 5, and allowed to stand in an environment at room temperature under a reduced pressure for a predetermined time, drying and removing the solvent. Thus, while maintaining the frozen state, the solvent (for example, ice) is permitted to undergo sublimation and drying, so that only a structure of a honeycomb form can remain.

Specifically, with respect to the closed vessel 4 obtained after the first drying step, while maintaining the reduced pressure state, the closed vessel containing therein the cylinder pieces 1A is first removed from the coolant bath 5. Then, the closed vessel is allowed to stand in an environment at room temperature (about 25° C.) under a reduced pressure for a predetermined time, promoting drying.

Like the first drying step, the proceeding of sublimation and drying of the solvent can be checked by observing the pressure in the closed vessel. In the second drying step, while maintaining the reduced pressure state in the first drying step, the closed vessel is exposed to room temperature, and therefore sublimation and drying of the solvent more quickly proceed. This can be found from a change of the pressure in the closed vessel 4, and, for example, the pressure in the closed vessel 4 is increased soon after the closed vessel 4 is exposed to room temperature. The reason for this is that the frozen solvent in the frozen dispersion further undergoes sublimation to generate water vapor in a large amount.

With respect to the retention time in the second drying step, there is no particular limitation, and retention may be terminated after completion of the drying. A yardstick of completion of the drying can be a point in time when the pressure in the closed vessel 4 is reduced to be a reference pressure, wherein the reference pressure is a pressure in a vacant closed vessel 4 which is reduced by a vacuum pump connected to the vacant closed vessel 4.

The method for producing a honeycomb structure of the present embodiment has been described above, and a honeycomb structure having excellent shape uniformity of the microtubes can be produced by the method. Further, the honeycomb structure produced by the method of the present embodiment can be advantageously used in, for example, a face mask and a filter for air cleaner and the like.

Further, by employing a preferred mode of the drying step in the present embodiment, the time required for drying can be remarkably reduced, as compared to the drying time required in a conventional unidirectional freezing method. Specifically, the solvent frozen in the freezing step is first dried in a low-temperature reduced-pressure environment (first drying), and then dried in an environment at room temperature under a reduced pressure, and therefore sublimation and drying of the frozen solvent can be efficiently conducted, making it possible to drastically reduce the production cost.

EXAMPLES

Hereinbelow, the present invention will be described in more detail with reference to the following Examples and Comparative Examples, which should not be construed as limiting the scope of the present invention.

First, with respect to the cellulose nanofiber, “cellenpia TC-01A”, manufactured by Nippon Paper Industries Co., Ltd. (average fiber length: 617 nm), was used for sample Nos. 1 to 8, and “RHEOCRYSTA I-2SX (registered trademark)”, manufactured by Dai-ichi Kogyo Seiyaku Co., Ltd. (antiseptic agent-free; average fiber length: about 800 to 100 nm), was used for sample Nos. 9 and 10, and each cellulose nanofiber was subjected to chemical oxidation using 2,2,6,6-tetramethylpiperidine-1-oxyl radical (TEMPO) to prepare a preliminary cellulose nanofiber dispersion. Then, using water, hydrochloric acid, and sodium hydroxide, the CNF concentration and pH of the preliminary cellulose nanofiber dispersion were adjusted to prepare a cellulose nanofiber dispersion. The prepared cellulose nanofiber dispersions are as shown in Table 1. Sample Nos. 1 to 4 and 6 were prepared from a water dispersion of sample No. 5 (CNF concentration: 3.0 wt %), and sample Nos. 1 to 4 were prepared by diluting sample No. 5, and sample No. 6 was prepared by concentrating sample No. 5. Accordingly, the “transmittance at 1 wt %” of all of sample Nos. 1 to 6 is 43%. Further, sample No. 9 was prepared by diluting a water dispersion of sample No. 10 (CNF concentration: 2.0 wt %). Accordingly, the “transmittance at 1 wt %” of sample No. 10 is 47% which is the same as that of sample No. 9. A light transmittance of the cellulose nanofiber dispersion at a wavelength of 550 nm was measured as mentioned above.

The obtained cellulose nanofiber dispersion was placed in a polypropylene tube (inner diameter: 16 mm; outer diameter: 18 mm; length: 180 mm), and then the polypropylene tube was vertically inserted into liquid nitrogen (−196° C.) at a constant rate of 10 cm/hr, and the portion of the solvent (water) inserted into the liquid nitrogen was caused to grow vertically and upward with respect to the surface of the liquid nitrogen into a columnar shape to form a plurality of ice columns, preparing a frozen cellulose nanofiber dispersion (unidirectional freezing method).

Procedure for the drying step was as follows.

The frozen cellulose nanofiber dispersion formed in the tube was cut, while maintaining the frozen state, together with the tube, into cylinder pieces each having a thickness of 10 mm. Then, the cut cylinder pieces were placed in a glass vessel connected to a vacuum pump, and allowed to stand in an environment at −5° C. under a reduced pressure for one hour, causing sublimation of the solvent in the cylinder pieces (first drying step).

With respect to the cutting method for the cylinder pieces to be subjected to freeze-drying, care was taken on the following points.

In freezing step, after starting the unidirectional freezing, water is rapidly frozen near the bottom of the tube, and the frozen surface moves upward from the bottom of the tube. The frozen surface is visible, and therefore a rate of movement of the frozen surface at each position of the tube can be measured. Near the bottom of the tube, the rate of movement of the frozen surface is larger than the unidirectional freezing rate (immersion rate), but, as the frozen surface moves toward the upper portion, the rate is reduced, and, at a position several cm above the bottom, the rate of movement of the frozen surface is consistent with the unidirectional freezing rate, so that growth of the ice columns is stabilized and the frozen surface becomes flat. In the present Examples, for appropriately evaluating the honeycomb structure, among the frozen dispersion, the frozen dispersion in the region in which the rate of movement of the frozen surface is not consistent with the unidirectional freezing rate, which region corresponds to the region near the bottom, was cut and removed, and only the upper portion of the frozen dispersion, i.e., only the portion of the frozen dispersion, in which the frozen surface was flat and moved upward at a rate equivalent to the immersion rate, was subjected to the drying step.

After the first drying step, while maintaining the reduced pressure state in the glass vessel, the glass vessel was removed from the coolant bath 5, and allowed to stand for 24 hours while maintaining the vessel temperature at room temperature (about 25° C.), performing freeze-drying (second drying step). In this step, the temperature of the glass vessel is room temperature, but the cylinder pieces are cooled by heat of sublimation caused when the solvent (ice) undergoes sublimation, and therefore freeze-drying can proceed without melting the solvent.

Immediately after the start of the second drying step, the pressure in the glass vessel was about 300 Pa, and the pressure was gradually reduced as drying proceeds, and, after a lapse of 24 hours, the pressure became 10 Pa and almost constant. At a point in time when the pressure became constant and was not reduced any more, freeze-drying was terminated, obtaining a honeycomb structure.

TABLE 1

| Sample No | Dispersion: CNF Concentration (wt %) | Dispersion: pH | Dispersion: Light transmittance (@550 nm) | Honeycomb opening diameter: Standard deviation of short diameter σ1 (μm) | Honeycomb opening diameter: Standard deviation of long diameter σ2 (μm) | Honeycomb opening diameter: Average opening diameter (μm) | μ2/μ1 (—) | Young's modulus (kPa) | Remarks |
|---|---|---|---|---|---|---|---|---|---|
| 1 | 0.1 | 7.6 | 43% | Unmeasurable due to malformation | | | | | Comparative Example |
| 2 | 0.5 | 7.4 | 43% | 36.2 | 88.9 | 90 | 2.6 | 928 | Comparative Example |
| 3 | 1.0 | 7.3 | 43% | 7.3 | 15.7 | 30 | 1.6 | 1,032 | Invention Example |
| 4 | 2.0 | 7.1 | 43% | 6.3 | 10.6 | 27 | 1.5 | 2,270 | Invention Example |
| 5 | 3.0 | 7.0 | 43% | 7.3 | 9.2 | 26 | 1.4 | 3,504 | Invention Example |
| 6 | 5.3 | 7.7 | 43% | 9.1 | 12.6 | 41 | 1.3 | — | Invention Example |
| 7 | 1.0 | 4.0 | 17% | Honeycomb structure cannot be obtained | | | | 100 | Comparative Example |
| 8 | 1.0 | 11.7 | 53% | 8.1 | 17.6 | 31 | 1.5 | 1,102 | Invention Example |
| 9 | 1.0 | 7.7 | 47% | 6.4 | 8.8 | 26 | 1.4 | 500 | Invention Example |
| 10 | 2.0 | 7.8 | 47% | 7.8 | 10.5 | 36 | 1.4 | 712 | Invention Example |

With respect the obtained honeycomb structures (sample Nos. 1 to 10), the shape and opening portions of the microtubes were observed by means of a scanning electron microscope (SEM). The "average long diameter μ2" and "average short diameter μ1" of the opening diameters of the microtubes were obtained in accordance with the same method as mentioned above by measuring a long diameter L1 (μm) and a short diameter Ls (μm) of 50 microtubes and determining an average of the diameters. Further, the standard deviations σ1, σ2 and average opening diameter were determined by the same method as mentioned above.

Further, among the obtained honeycomb structures, with respect to sample Nos. 2 to 5 and 7 to 10, mechanical properties (Young's modulus) were determined. Specifically, a stress-strain curve was measured using a strength tester ("AG-50kNXplus", manufactured by Shimadzu Corporation), and a Young's modulus (kPa) was determined from the obtained stress-strain curve. In this instance, with respect to all the samples (cylinder pieces), a stress-strain curve was measured by repeating 10 times an operation in which the sample was compressed to a 50% displacement and then immediately released.

FIG. 4 shows SEM images of sample Nos. 1 to 8.

With respect to each of the sample Nos. 1 and 2, the honeycomb structure considerably deteriorated, and microtubes having ununiform opening diameters were formed. The reason for this is presumed that the CNF concentration was such low that the wall of the microtubes formed had an unsatisfactory thickness, so that satisfactory formation of a honeycomb was not achieved. The opening diameter of the sample No. 1 was not able to be measured due to malformation of the honeycomb structure.

With respect to the sample No. 7 (pH 4.0; transmittance: 17%), an excellent honeycomb structure was not obtained. On the other hand, with respect to the sample No. 3 (pH=7.3; transmittance: 43%) and sample No. 8 (pH=11.7; transmittance: 53%), each of which has the same concentration as that of the sample No. 7, an excellent honeycomb structure was obtained. In the sample No. 7, it is considered that coagulation of the cellulose nanofiber was caused to lower the transmittance, and further the resultant coagulation product avoided growth of ice crystals, so that an excellent honeycomb structure was not formed.

Further, as apparent from the Young's modulus of the sample Nos. 3 to 5, by using the dispersion having an increased CNF concentration, a harder honeycomb structure can be obtained.

REFERENCE SIGNS LIST

1: Cellulose nanofiber dispersion (Dispersion)
1A: Cylinder pieces (Frozen dispersion)
2: Vessel
3: Coolant
4: Closed vessel
5: Coolant bath
6: Pressure reducing means
7: Pressure gauge

The invention claimed is:

1. A method for producing a honeycomb structure of a cellulose nanofiber, the method comprising the steps of:

slowly inserting a vessel, which contains therein a dispersion having the cellulose nanofiber dispersed in a solvent, into a coolant to cause the solvent to freeze and grow vertically and upward with respect to the surface of the coolant (freezing step); and removing the solvent from the dispersion (drying step), wherein the dispersion has a cellulose nanofiber concentration of 1.0 wt % or more, wherein the dispersion having a cellulose nanofiber concentration of 1.0 wt % has a light transmittance of 20 to 80% at a wavelength of 550 nm.

2. The method for producing a honeycomb structure according to claim 1, wherein the dispersion has a pH of 4.0 to 13.9.

3. The method for producing a honeycomb structure according to claim 1, wherein the cellulose nanofiber has an average fiber length of 0.15 μm or more.

4. The method for producing a honeycomb structure according to claim 1, wherein the drying step has the steps of:

allowing the dispersion obtained after the freezing step to stand in an environment at 0° C. or lower under a reduced pressure for a predetermined time (first drying step); and allowing the dispersion to stand in an environment at room temperature under a reduced pressure, removing the solvent (second drying step).

5. The method for producing a honeycomb structure according to claim 1, wherein the dispersion has a cellulose nanofiber concentration of 2.0 wt. % or more.

6. The method for producing a honeycomb structure according to claim 1, wherein the dispersion has a pH of 4.0 to 7.8.

* * * * *